United States Patent
Ingham

[15] 3,693,499
[45] Sept. 26, 1972

[54] PLANER FOR MACHINING HELICAL SURFACES OF IDENTICAL BUT OPPOSITELY DIRECTED LEADS ON COMPANION SHEAR DRUMS

[72] Inventor: James D. Ingham, Thomaston, Conn.

[73] Assignee: The Hallden Machine Company, Thomaston, Conn.

[22] Filed: Sept. 3, 1970

[21] Appl. No.: 69,233

[52] U.S. Cl. ............................................ 90/29, 90/32
[51] Int. Cl. ................................................ B23d 5/02
[58] Field of Search .................... 90/29, 32, 30, 11.62

[56] References Cited

UNITED STATES PATENTS

| | | |
|---|---|---|
| 1,004,619 | 10/1911 | Berold ............................ 90/29 |
| 1,384,542 | 7/1921 | Schmick .................... 90/32 X |
| 906,782 | 12/1908 | Donaldson ...................... 90/32 |
| 259,043 | 6/1882 | Reynolds ........................ 90/29 |

*Primary Examiner*—Gil Weidenfeld
*Attorney*—Walter Spruegel

[57] ABSTRACT

An operationally reciprocating traverse table of a planar, with at least one tool head on a cross rail, carries two parallel pairs of bearing-type end supports for two drums, of which adjacent end supports of the pairs are, through a gear drive connection on the table with a fixed rack, operationally driven through equal angular distances but in opposite directions on each traverse motion of the table, and either driven end support is releasably coupled to the associated supported drum, whereby the tool on the head may be operated to machine on the supported drum on the reciprocating table a helical surface of a uniform lead and in a direction depending on the pair of end supports on which the drum is supported.

1 Claim, 7 Drawing Figures

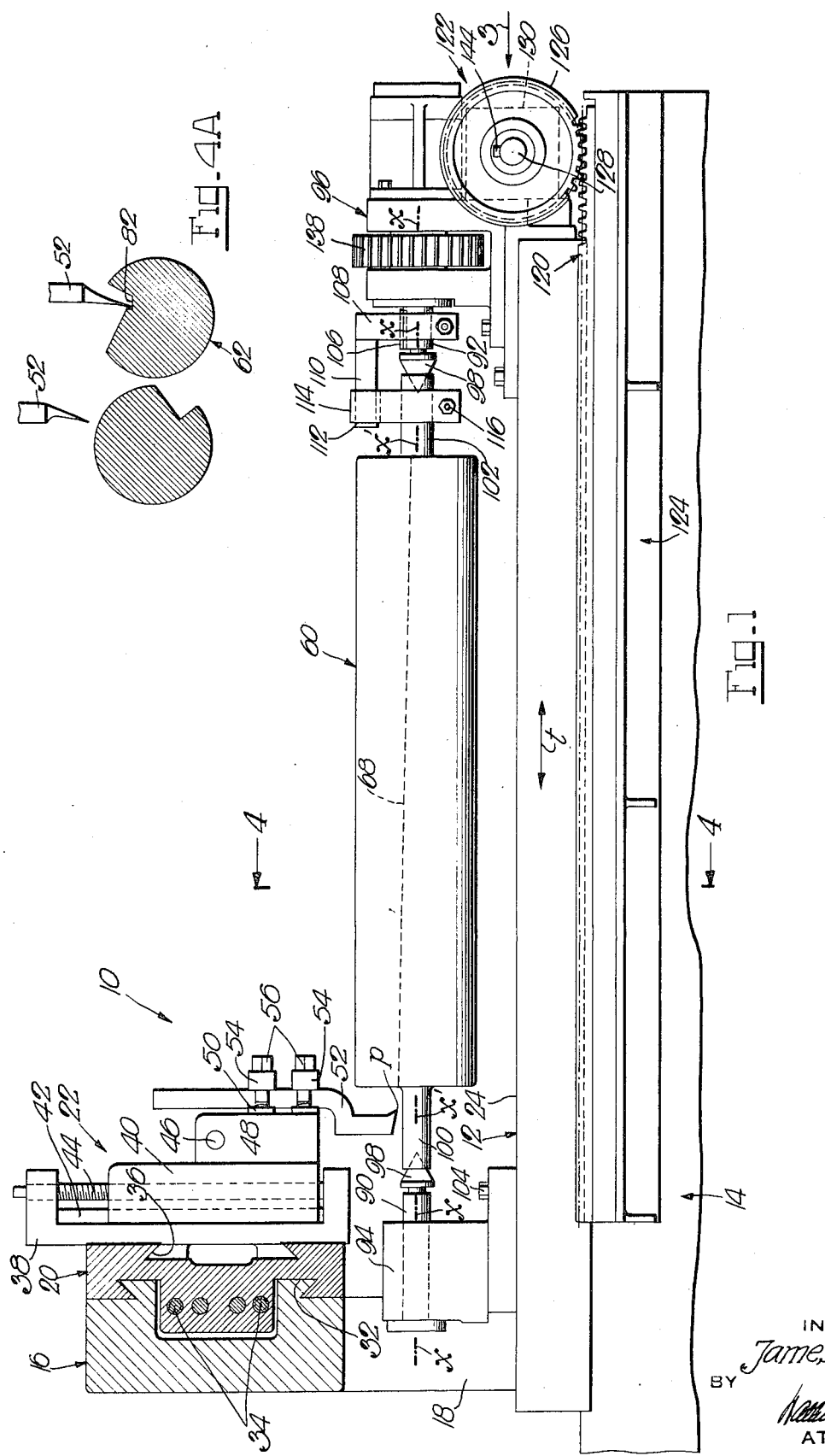

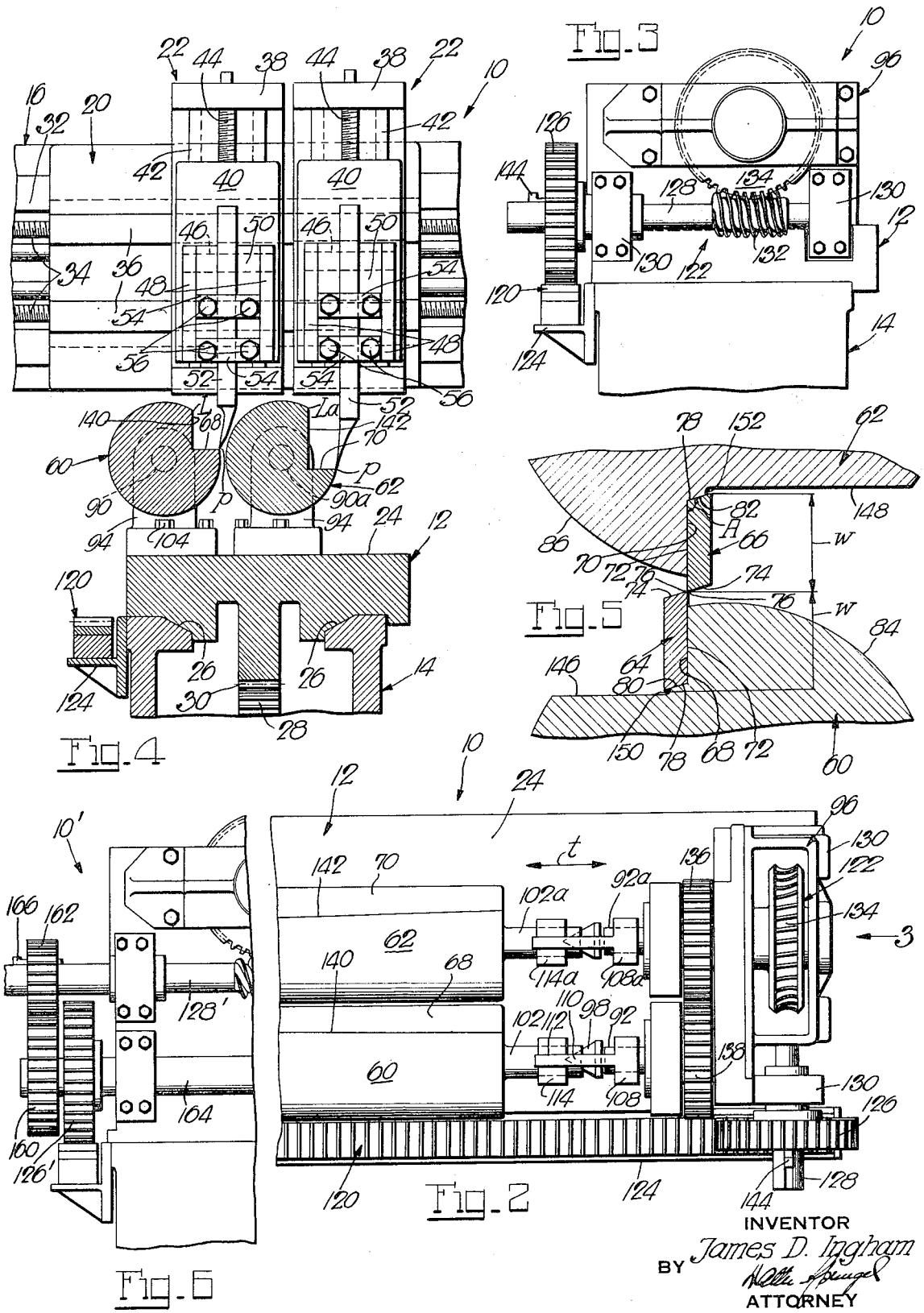

PLANER FOR MACHINING HELICAL SURFACES OF IDENTICAL BUT OPPOSITELY DIRECTED LEADS ON COMPANION SHEAR DRUMS

This invention relates to machine tools in general, and to planers for machining helical surfaces in particular.

The present invention is concerned with a type of planer which lends itself to machining helical blade-backing shoulders of identical but oppositely directed leads on companion drums of rotary shears. To cut soft and hard stock, including paper and steel, cleanly and smoothly, as well as for a comparatively long time before necessitating resharpening of the shear blades, it is imperative that the cutting edges of the blades, and hence also the blade-backing shoulders on the drums, extend in accurate helical planes of the same lead throughout but in opposite directions. It has further been found highly advantageous to form the shear blades rectangular in the first place, and with a front face and slanting top and bottom surfaces which are parallel to each other, and of which the top surface forms the same acute angle throughout with the front face, with the cutting edge being at the junction of the front face and top surface, and to form the companion drums at the bottoms of the helical blade-backing shoulders with slanting rest surfaces of helical extent and of the same lead as the associated blade-backing shoulders, with the slant of the rest surfaces being such that the bottom surfaces of the blades are in form-fit therewith when they are with their front faces fully backed against the associated drum shoulders. With this arrangement, and with the drums accurately located for precise cutting coordination of their blades throughout their lengths, any dull blade need merely be removed from its drum and resharpened by machining its front face, whereby on mere remounting, i.e., firm bolting, of the blade with its front face and bottom surface resting on the shoulder and rest surface of the drum, the blade is returned into as precise cutting coordination with its companion blade as it was before its removal from the drum for resharpening.

It is a primary object of the present invention to provide a planer of this type in which the shoulders and rest surfaces on companion drums may be machined with the required high accuracy in their helical extent at the same identical but oppositely directed leads throughout.

It is another object of the present invention to provide on the operationally reciprocating traverse table of a planer of this type bearing-type end supports for a drum of which one end support is releasably coupled to the drum, and is driven through a gear connection with a fixed rack in the traverse direction, whereby the drum is turned in equal angular increments directly proportional to equal longitudinal travel increments of the drum with the traverse table, and the drum being thus turned in opposite directions on traverse movement of the table in opposite directions in one of which a cutting tool performs on the drum. With this arrangement, rotation of the drum is locked in with the driven end support and its gear connection with the rack, which is without operational play since on each traverse motion of the table in tool-cutting direction all gear backlash is taken up by the cutting resistance the tool encounters on the drum, with the result that the machined drum surface will be of the required high accuracy in the aforementioned respects.

It is a further object of the present invention to provide a planer of this type of which the aforementioned gear connection of the driven drum end support with the fixed rack includes a spur gear in mesh with the rack, and a worm and worm gear driven by the spur gear and driving the drum end support, respectively, of which the spur gear is meshable with and demeshable from the rack. With this arrangement, and since the machined drum surfaces customarily have a very large lead requiring operational rotation of the drum of but a few degrees over its longitudinal travel, the spur gear is of relatively large size so as to turn the worm through very few revolutions during longitudinal drum travel, and the gear ratio of the worm and worm gear must still be quite large to keep operational rotation of the drum at the required few degrees over its longitudinal travel. The large gear ratio of the worm and worm gear is also highly advantageous in that, on machining a shoulder on a drum and subsequently demeshing the spur gear from the rack, the spur gear and worm may be manually rotated to operate the worm gear so as to bring the drum into proper angular coordination with the cutting tool for machining the rest surface thereon, with the angular displacement of the drum into the new angular coordination with the cutting tool being quite substantial, but being for each drum exceedingly accurate and without any tolerance on turning the spur gear and worm for a given number of teeth of the gear which produce a selected standard slant angle of the rest surface with the associated shoulder, with turning of the spur gear and worm for the given number of gear teeth being achieved preferably with the aid of a counter which counts each gear tooth to thereby obviate any possible miscount.

Another object of the present invention is to provide a planer of this type in which the helical shoulders and rest surfaces of identical but oppositely directed leads on companion drums may be machined, by providing on the traverse table two parallel sets of bearing-type end supports, each set for the support of a drum, of which one end support of a first set is driven through its aforementioned gear connection with the fixed rack, and the end support of the other set next to the driven end support of the first set is driven by a pair of gears of one-to-one gear ratio which are mounted on the respective driven end supports and in mesh with each other. With this arrangement, the driven end supports of both sets will, on their longitudinal travel with traverse table, be turned equal amounts but in opposite directions, whereby either one of a pair of companion drums may be machined on supporting the same in the end supports of the appropriate set and releasably coupling it with the driven end support thereof, or, with two tool heads on the cross rail of the planer, both drums of a companion pair may be machined, simultaneously for the formation of the shoulders and successively for the formation of the rest surfaces, on supporting them on the end supports of the respective sets and releasably coupling them with the driven end supports thereof.

It is a further object of the present invention to provide a planer of this type in which the helical shoulders and rest surfaces on companion drums may be machined at different leads, by interposing between the aforementioned spur gear and worm of the gear connection between one of the driven drum end supports and the rack a pair of meshing spur gears of a given gear ratio which are replaceable with pairs of gears of other gear ratios.

It is another object of the present invention to provide a planer of this type in which the shoulders and rest surfaces on companion drums are machined with the utmost accuracy in their helical disposition at identical but oppositely directed leads, by using a cutting tool or tools with a cutting point.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a side view, partly in section, of a planer embodying the invention;

FIG. 2 is a fragmentary top plan view of the planer;

FIG. 3 is an end view of part of the planer as seen in the direction of the arrow 3 in FIG. 1;

FIG. 4 is a fragmentary cross-section through the planer as taken on the line 4—4 of FIG. 1;

FIG. 4A is similar to a part of the section in FIG. 4, with work in the planer being shown in a different angular position for machining; and FIG. 5 is a fragmentary section through companion shear drums having certain helical surfaces machined in the planer of FIGS. 1 to 4.

FIG. 6 is a fragmentary view showing an alternate gear ratio for machining a different lead on the helical drums.

Referring to the drawings, and more particularly to FIGS. 1 to 4 thereof, the reference numeral 10 designates a planer having a traverse table 12 on a base 14, a cross rail 16 on spaced uprights 18, a cross slide 20 on the rail 16, and in this instance two tool-carrying heads 22 on the slide 20.

The table 12, which has a plane top 24 adapted for the support of work to be machined, and more especially planed, is guided on ways 26 on the base 14 (FIG. 4) for movement in traverse direction indicated by the arrow t in FIGS. 1 and 2. The table 12 is operationally reciprocated in traverse direction by any conventional power drive, including in this instance a bull gear 28 and a bottom rack formation 30 on the table 12 (FIG. 4).

The cross rail 16, which extends parallel to the plane table top 24 and normal to the traverse direction t, provides a dovetail guide 32 for the slide 20. Rotatably supported in the cross rail 16 are two spindles 34 which are in threaded engagement with the slide 20. The slide 20 is in its front face provided with a dovetail guide 36 for the tool-carrying heads 22. Each head 22 consists of a rear section 38 and a front section 40, of which the rear section 38 is slidable in the dovetail guide 36 in the slide 20, and the front section 40 is vertically slidable in a dovetail guide 42 on the rear section 38, and is in threaded engagement with a turnable spindle 44 in the rear section 38 (FIGS. 1 and 4). Pivoted at 46 to spaced forward lugs 48 on the front section 40 of each head 22 is a gate 50 on which a planer tool 52 is mounted by bars 54 and bolts 56. The rear sections 38 of the heads 22, which are movable on the slide 20 into any positions of adjustment relative to each other, are releasably locked in adjusted position by any suitable means (not shown). Further, each planer tool 52, which is a cutting tool with a preferred cutting point p, is adjustable to and from the table top 24 on turning the associated spindle 44 in opposite directions. The spindles 34 for moving the slide 20 on the cross rail 16 are jointly operated by a conventional power drive (not shown) which is under selective manual and automatic control, with the manual control serving to move the slide 20 to any cut-start position on the cross rail 16, and the automatic control serving to index the spindles 34 after presettable time intervals for stopping the slide from cut-start position into successive cut position in either direction, with the tools 52 each making a single cut on work in each of these successive cut positions of the slide 20.

The planer described so far is of a conventional type which may perform different planing operations on different types of work. However, by adding certain attachments to the planer, the same will lend itself to special machining operations on special work. The contemplated special work are companion shear drums of rotary shears, and the contemplated special machining operations are the formation on such companion drums of helical surfaces of identical, but oppositely directed, leads. FIG. 5 shows, in fragmentary cross-section, a pair of such companion drums 60 and 62 in their correct coordination in a rotary shear, and in this instance at a time when companion shear blades 64 and 66 on the respective drums 60 and 62 are in shearing cooperation with each other. The shear blades 64 and 66, while being straight blades in demounted condition, are highly preferred helical action blades which, for their mount on the drums, are flexed against helical backing shoulders 68 and 70 on the respective drums 60 and 62 and firmly mounted thereon by bolts (not shown), wherefore these helical drum shoulders determine the helical disposition of the blades. Further, each blade 64 and 66 has a front face 72 and a slanting top surface 74 which at its junction with the front fact 72 forms a cutting edge 76, and further has a bottom surface 78 which is parallel to the slanting top surface 74, with each blade being with its front face 72 backed against the helical shoulder on the respective drum. Also, each blade 64, 66 is preferably of the same uniform width w throughout. The blades 64 and 66, besides being backed with their front faces 72 against the helical shoulders 68 and 70 on the respective drums 60 and 62, are also backed with their slanting bottom surfaces 78 against rest surfaces 80 and 82 on these drums, with these rest surfaces 80 and 82 being slanted so as to be in form-fit with the thereon resting bottom surfaces 78 of the blades 64 and 66 when the latter are with their front faces 72 also fully backed against, and hence in form-fit with, the helical shoulders 68, 70 on the respective drums 60 and 62. The height of the shoulder 68 on the drum 60, measured from its junction with the rest surface 80, is uniform throughout its helical extent, and the height of the shoulder 70 on the other drum 62, measured from its junction with the rest surface 82, is also uniform throughout its helical extent, wherefore the cutting edges 76 of the blades 64 and 66 are throughout their helical extents equally spaced from the peripheries 84 and 86 of the respective drums 60 and 62 and thus make for even cutting of stock which, moreover, is progressive across the width of the stock-being-cut owing to the helical disposition of the blades. Of course, for cutting coordination of the companion blades 64 and 66, they must extend helically at identical, but oppositely directed, leads, meaning that the shoulders on the companion drums must have the same identical, but oppositely directed, leads. Also, in order that the rest surfaces 80 and 82 on the respective drums 60 and 62 may accurately locate the blades 64 and 66 with their bottom surfaces 78 on these drums, the rest surfaces 80 and 82 must extend helically at the same uniform lead as the associated shoulders 68 and 70. With this arrangement, either blade, when sufficiently dull to require resharpening, is simply removed from its drum and is resharpened by simple machining of its front face, whereupon on mere remounting of the blade with its front face and bottom surface firmly backed against the helical shoulder and rest surface on the drum, the blade is with its resharpened cutting edge as accurately coordinated with the cutting edge of the companion blade as it was before its removal and resharpening.

In order that the companion blades 64, 66 may smoothly cut soft and hard stock, including paper and steel, for a comparatively long time before they require resharpening, and also after each resharpening and mere remounting on the drums, it is imperative that the active blades extend with high accuracy helically at identical, but oppositely directed, leads, with their cutting edges remaining at all times in the same accurate cutting coordination. This is achieved only if the shoulders and associated rest surfaces on the companion drums extend with the same high accuracy helically at identical, but oppositely directed leads, as will be readily understood.

The special operations contemplated for the planer 10 are the machining or planing of the helical shoulders and rest surfaces of companion drums. To this end, there are attached to the planer special work holders and special operating provisions for them.

The work holders are in the form of two pairs of bearing-type end supports, of which each pair is adapted for rotary support of a drum. Since both pairs of end supports are identical, only one pair will be described in detail, with identical elements of the other pair being identified, where needed, by the same reference numerals but with the suffix $a$ added. Thus, with reference to FIGS. 1, 2 and 4, the bearing-type end supports of one pair are shafts 90 and 92 which are suitably journalled in a saddle 94 and in suitable bearings in a casing 96, respectively, with the shafts 90 and 92 having centers 98 for supporting the drum 60, for example, at its opposite shaft stubs 100 and 102. The casing 96 is suitably mounted, preferably by bolts, on the traverse table 12 while the saddle 94 is at 104 adjustably and removably bolted to the traverse table 12. The rotary axes $x, x$ of the shafts 90 and 92 are coaxial with each other and with the axis $x'$ of the supported drum 60, with these axes also extending parallel to the traverse direction $t$. The shaft 92, which is a driven shaft, is releasably coupled to the supported drum 60. To this end, the shaft 92 has keyed thereto at 106 an arm 108 with a coupling bar 110 which at 112 is releasably keyed to a split arm 114 that is releasably but firmly clamped to the shaft stub 102 on the supported drum by a bolt 116.

The operating provisions for the drum holders, which are drive provisions for the driven drum-supporting shafts 92 and 92a, take the form of a fixed rack 120, and a gear connection 122 between these shafts 92, 92a and the rack 120. The rack 120 is suitably mounted on a side bracket 124 on the planer base 14, and extends parallel to the traverse direction $t$. The gear connection 122 provides a spur-type end gear 126 which is in mesh with the rack 120 and carried by a shaft 128 which is journalled in bearing brackets 130 on the casing 96. Also carried by the shaft 128 is a worm 132 which is in mesh with a worm gear 134 on the driven shaft 92a. Thus, on operational reciprocation of the traverse table 12 in opposite directions, the gear connection 122 described so far will turn the driven drum supporting shaft 92a through equal angular distances in opposite directions, as will be readily understood. For the drive of the other driven drum-supporting shaft 92, the gear connection 122 further provides a pair of spur gears 136 and 138 of one-to-one gear ratio which are mounted on the respective shafts 92a and 92, and are in mesh with each other. Thus, on each traverse motion of the table 12 in either direction, the driven drum-supporting shafts 92 and 92a will be turned through the same angular distance but in opposite directions.

For simultaneously machining the blade-backing shoulders 68 and 70 on a pair of companion drums 60 and 62, the latter are first supported on the centers of the respective pairs of supports shafts 92, 90 and 92a, 90a (FIGS. 1, 2 and 4), whereupon the driven shafts 92 and 92a are releasably coupled to the adjacent shaft stubs 102 and 102a of the respective drums 60 and 62 (FIG. 2). With the traverse table 12 being then in its forward position in FIG. 1, the tool heads 22 are adjusted on the slide 20, and the tools 52 vertically adjusted on their heads 22, so that the cutting points $p$ of the tools are in cut-start positions in which they will, on the first operational traverse motion of the table 12 to the left (FIG. 1) into a rearmost position, i.e., its cutting stroke, machine into the drums along the helical peripheral lines L and La (FIG. 4). During the customarily faster return or idle stroke of the table 12 to its forward position, the tools 52 will with their gates 50 be swung anticlockwise (FIG. 1) so as to ride idly over the drums. The control of the drive of the spindles 34 being then already set to automatic, the slide 20 will, before the next cut stroke of the table 12, be stepped to the right (FIG. 4) to bring the tools 52 into the next successive cut position in which they will produce the next cut on the drums on the next cut stroke of the table. The tools 52 will thus be brought into sufficient successive cut positions before each next cut stroke of the table 52 until the tool points run out on the drum peripheries. Thereupon, and while the table is in its foremost position (FIG. 1) the slide 22 is by the spindles 34 quickly moved to the left (FIG. 4) to bring the tools 52 into the next cut-start position, and the tools are moved vertically for the depth of the next successive cuts by momentary operation of the respective spindles 44, which may be done manually, but is preferably also under settable automatic control (not shown). Thus, with the tools 52 being then ready for successive cuts on the drums, the slide 22 is again stepped to the right (FIG. 4) for successive cuts by the tools on the drums until again running out on the peripheries of the latter. This same sequence of operations of the slide 22, tool heads 22 and tools 52, is repeated until the tools produce the final cuts for the finish-formation of the helical shoulders 68 and 70 on the respective drums 60 and 62 (FIG. 4). This leaves the drums 60 and 62 with the finish-machined shoulders 68 and 70 and also with machined surfaces 140 and 142 which extend helically at the same lead as the respective shoulders 68 and 70 (FIGS. 1 and 2), and further extend at each cross-section normal to the respective shoulders 68 and 70 (FIG. 4).

Next, the rest surfaces 80 and 82 may be machined on the drums 60 and 62 (FIG. 5), involving machining into the drum surfaces 140 and 142. However, and as will appear obvious later, these rest surfaces are not machined simultaneously in both drums, but they are machined in one drum at a time, in this instance first in the drum 62 (FIG. 4A). To this end, the tools 52 are moved out of the way of the supported drums 60 and 62 to permit indexing of the latter into different angular positions in which the selected first drum 62 is in the correct position for machining the rest surface 82 (FIG. 4A). The supported drums are thus indexed by manual rotation of the spur gear 126 after first demeshing the same from the rack 120. For thus temporarily demeshing the gear 126 from the rack 120, the former is splined to the worm shaft 128 by a slidable key 144, whereby on sliding this key outwardly on the worm shaft, the spur gear 126 may be slid out of mesh with the rack while remaining keyed to the worm shaft. For indexing the drums, the demeshed spur gear 126 must be turned for a given number of its teeth, whereupon on completed drum indexing, the spur gear will be remeshed with the rack on axially sliding the former onto the latter. In this connection, and as earlier mentioned, the lead of the machined shoulder on each drum is customarily quite large, requiring but a few degrees rotation of the drums on each cut stroke of the traverse table 12, wherefore the gear 126 in mesh with the rack 120 is of relatively large size, and the gear ratio of the worm gear is also quite large, in order that operational drum rotation is kept at the referred-to few degrees. Accordingly, in order to index the drums through the extensive angular distances involved to bring them into the new angular positions for machining the rest surface 82 on the first drum 62 (FIG. 4A), the demeshed spur gear 126 will have to be turned for a relatively large number of teeth which determine the selected standard slant angle A between the shoulder 70 and the rest surface 82 to-be-machined on the drum 62 (FIG. 5). To avoid a possible miscount of this relatively large number of teeth through which the gear 126 must be turned and, hence, avoid wrong machining of the rest surface 82, the spur gear 126 is manually turned with the aid of a counter which counts each gear tooth. In thus indexing the drums, the drum 62 will assume its new angular position in which on the subsequent machining of the rest surface 82 thereon, the latter will slant relative to the associated shoulder 70 at the selected angle with the highest accuracy and without any tolerance whatever.

Having once indexed the drums and remeshed the gear 126 with the rack 120, the tool 52 associated with the drum 62 is adjusted in its position for starting the machining of the rest surface 82 on this drum. In this connection, such tool adjustment must be undertaken solely by adjustment of its head 22 in the dovetail guide 36 in the slide 20, and further adjustment of the head section 40 in the dovetail guide 42 on the other head section 38 by the spindle 44 (FIG. 1), in order to machine the rest surface 82 at the same identical lead of the machined shoulder 70. Machining of this rest surface 82 on the drum proceeds by similar sequential operations of the drum and tool as in the preceding machining of the shoulder 70 thereon, with the tool 52 being in FIG. 4A shown at the start of the final successive cuts in the formation of the rest surface 82.

With the rest surface 82 on the drum 62 now finished, preliminary steps are undertaken for machining the rest surface 80 on the other drum 60, these steps being removal of the tools out of reach of the drums, indexing of the drums to bring the drum 60 into position for machining the rest surface 80 thereon, and adjustment of the tool 52 associated with the drum 60 into position for machining the rest surface 80. Thereupon, the planer will be set in operation to machine the rest surface 80 much in the same manner in which the rest surface 82 on the drum 62 was machined.

The companion drums 60 and 62 have further machined surfaces 146 and 148 (FIG. 5) which at 150 and 152 undercut the rest surfaces 80 and 82 on the respective drums 60 and 62 within the widthwise extent of the thereon resting bottom surfaces 78 of the shear blades 64 and 66 for clearance of these blade surfaces 78 from the drum surfaces 146 and 148. These drum surfaces 146 and 148 are preferably also machined in the present planer, one at a time, however, because indexing of the drums into position for machining the remaining surface on one drum will bring the other drum far from the correct position for machining its remaining surface. Insofar as actually machining these remaining drum surfaces 146 and 148 is concerned, the procedure is quite obvious by now and requires no further description. In thus machining also these remaining drum surfaces 146 and 148 in the present planer, there is this further advantage that these surfaces will extend helically at the same identical lead as the associated shoulders and rest surfaces, which considerably facilitates customary removal of material from the drums at the correct places (not shown) for dynamically balancing the drums.

While in the described exemplary operation of the planer a pair of companion drums are machined, with the drum shoulders being machined simultaneously and the remaining drum surfaces being machined one at a time, it is, of course, entirely feasible, and sometimes preferred, to support only one of a pair of companion drums in the correct pair of end supports on the planer and successively machine the different surfaces thereof. Also, while the exemplary drums 60 and 62 machined in the planer have initially cylindrical peripheries throughout, it is, of course, entirely feasible to machine in the same planer the same helical surfaces on drums, or even drum inserts, of cross-sectional shapes other than cylindrical.

Reference is now had to FIG. 6 which shows a planer 10' which may in all respects be like the described planer 10 of FIGS. 1 to 4, except that in the present planer 10' the drum surfaces may be machined helically at different leads. To this end, there is interposed between the worm shaft 128' and the rack gear 126' a pair of meshing gears 160 and 162 of a given gear ratio, with the gear 160 being removably mounted on the same shaft 164 of which the rack gear 126' is mounted, and the other gear 162 being removably mounted, in this instance by a slidable key 166, on the worm shaft 128', wherefore the gear pair 160, 162 is replaceable with another gear pair of a different gear ratio for a different lead of the helical drum surfaces machined in the planer. Further, the gear 162 may be demeshed from the gear 160 while remaining keyed to the worm shaft 128', for drum indexing.

What is claimed is:

1. In a planer for machining helical surfaces at identical angles to each other and of identical but oppositely directed leads on companion shear drums with rotary axes, the combination of a traverse table lying in a plane and being operationally reciprocated in said plane in a given traverse direction; a cross rail with at least one tool-carrying head, of which the rail extends lengthwise in a direction parallel to said plane and transverse to said traverse direction, said head is operationally moved from any position on said rail lengthwise thereof into successive cut positions, a tool carried by said head and said tool has a cutting point and is adjustable on said head with its point to and from said plane; two pairs of bearing-type end supports on said table, of which first end supports of said pairs are arranged side-by-side and are rotary about axes parallel to each other and to said traverse direction, with each pair of end supports having means for bearing support of a drum with their axes coaxial with the rotary axes of said first end supports thereof, and having means for releasably coupling to the latter a supported drum for rotation therewith; a fixed rack extending parallel to said traverse direction; a gear train carried by said table and including a worm gear and a spur gear turning with one of said first end supports and meshing with said rack, respectively, and a worm in permanent mesh with said worm gear, with said spur gear being splined to said worm for mesh with and demesh from said rack; two gears of one-to-one gear ratio mounted on said first end supports, respectively, and in mesh with each other, whereby on traverse movement of said table said first end supports are turned through equal angular distances but in opposite directions, and said first end supports are angularly displaceable relative to each other on demeshing said spur gear from said rack and turning the demeshed spur gear.

* * * * *